United States Patent [19]

Scholin

[11] 4,062,574
[45] Dec. 13, 1977

[54] FITTING ASSEMBLY

[75] Inventor: Harold W. Scholin, Park Ridge, Ill.

[73] Assignee: Scholin Industries, Inc., Chicago, Ill.

[21] Appl. No.: 729,774

[22] Filed: Oct. 5, 1976

[51] Int. Cl.² .............................................. F16L 19/08
[52] U.S. Cl. ...................................... 285/340; 285/382
[58] Field of Search ............... 285/104, 105, 374, 340, 285/423, 321, 323, 382

[56] References Cited

U.S. PATENT DOCUMENTS

| 1,822,056 | 9/1931 | Noble | 285/340 |
| 2,484,192 | 10/1949 | Squiller | 285/340 X |
| 3,743,326 | 7/1973 | Courtot | 285/323 X |
| 3,874,709 | 4/1975 | MacDonald | 285/423 X |
| 3,963,267 | 6/1976 | Legris | 285/323 X |

FOREIGN PATENT DOCUMENTS

| 6,806,401 | 11/1968 | Netherlands | 285/340 |
| 1,195,723 | 6/1970 | United Kingdom | 285/340 |

Primary Examiner—Dave W. Arola
Attorney, Agent, or Firm—Emrich, Root, O'Keeffe & Lee

[57] ABSTRACT

A fitting assembly for coupling a tubular member to mechanical devices, such as valves or cylinders is disclosed wherein the fitting includes a body member having therein a passageway communicating with the tube, and a plurality of bores of increasing diameters in which a sealing ring in one bore is held in position by a retaining ring in another bore, and a retainer member in said other bore holds the sealing ring and retaining ring in place. The retaining ring holds the tube against inadvertant removal by having an inner diameter thereof in gripping engagement with the outer surface of the tube.

4 Claims, 6 Drawing Figures

FITTING ASSEMBLY

BACKGROUND OF THE INVENTION

Couplings have heretofore been known and used, wherein a smooth walled tube of plastic, rubber, or relatively soft metallic material, such as copper or aluminum, may be forced into a fitting assembly and retained therein against inadvertant removal, but they have been relatively complicated, comprising a great number of parts, and, expensive to manufacture and assemble. Furthermore, many of the prior art devices have had to be disassembled in order to remove the tube. In other instances it has been necessary to release the tube by the use of additional tools, or by manually manipulating moveable clamping jaws within the fitting.

Examples of prior art patents which have the foregoing disadvantages include the following:

| Briegel | 2,284,365 | May 26, 1942 |
| Ream | 2,670,223 | February 23, 1954 |
| Sapy et al | 3,653,689 | April 4, 1972 |
| Sands et al | 3,844,585 | October 29, 1974 |
| Legris | 3,909,046 | September 30, 1975 |
| Ellis | 3,924,882 | December 9, 1975 |

Additional prior art patents relating to this general subject matter are:

| Meier | 3,637,240 | January 25, 1972 |
| Kay | 3,817,561 | June 18, 1974 |
| Gallagher | 3,858,913 | January 7, 1975 |
| Legris | 3,889,989 | June 17, 1975 |
| Ellis | 3,895,832 | July 22, 1975 |
| Legris | 3,963,267 | June 15, 1976 |
| Belgian Pat. No. | 541,480 | October 15, 1955 |

BRIEF SUMMARY OF THE INVENTION

This invention relates to a fitting assembly, and more particularly to a fitting assembly adapted to receive and retain therein a smooth walled tube merely by pressing or forcing the end of the tube into the fitting.

It is a principal object of the present invention to provide a fitting assembly which is simple in construction, easy to assemble and relatively inexpensive to manufacture.

Another object is to provide a fitting assembly wherein a main body member adapted to receive and retain therein a tubular member, has a plurality of bores therein of different diameters, and in which are placed a sealing ring, a retaining ring, and a retainer member for holding the sealing and retaining rings in assembled relation.

A further and more specific object of the invention is to provide a fitting assembly which is adapted to receive and retain therein a smooth walled tube wherein a sealing ring and retaining ring are assembled together therein and held by a retainer member, and wherein the inner diameter of the retaining ring is smaller than the tubular member and is bent so as to grip the tubular member and prevent inadvertent removal thereof.

Other objects and advantages of the invention will appear more fully herein as the description proceeds.

Figure 1:
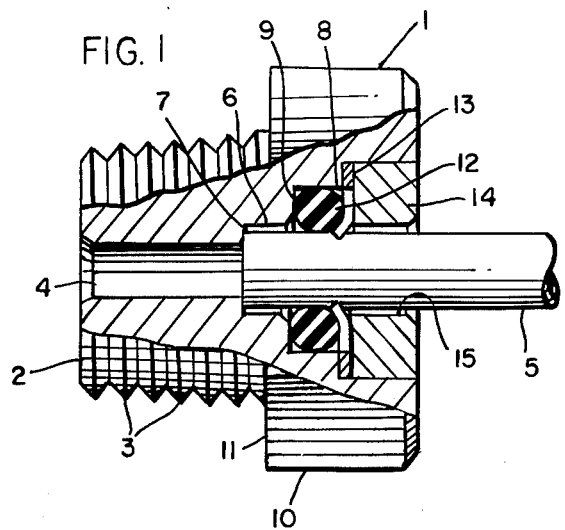
FIG. 1 is a side elevational view partly in section, of the fitting assembly of the present invention showing the tubular member inserted and held in place therein.
Figure 2:
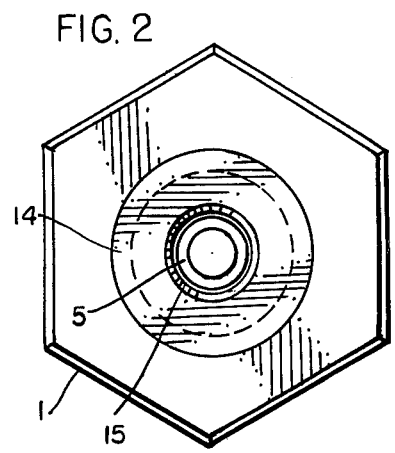
FIG. 2 is an end elevational view of the fitting assembly looking toward the left as viewed in FIG. 1.
Figure 3:
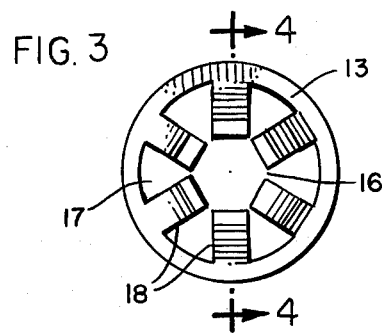
FIG. 3 is an elevational view of a preferred form of retaining ring.

DETAILED DESCRIPTION OF THE PREFERRED FORM OF THE INVENTION:

The fitting assembly embodying the present invention comprises a main body member indicated generally by the numeral 1 in FIGS. 1 and 2. This member may be formed from round bar stock, or it may be made from hexagonal stock as illustrated herein, and be provided with an outwardly extending neck 2 at one side thereof provided with threads 3, for attaching to a mechanical device, such as a valve or a cylinder. The purpose of the fitting is to be able to connect a tubular member to a mechanical device which is to be operated by fluid under pressure flowing through the tube. It is designed primarily for plastic tubing, such as nylon, Teflon and the like, but it may also be used on hard rubber tubing and metal tubing such as copper and aluminum.

Since the tubular member can be connected to the main body of the fitting merely by pushing or forcing the end thereof into the fitting it is often referred to in the art as a "stabtype". The main body member 1 is provided with a passageway 4 therein for communication with the tubular member 5. A first bore, indicated by the numeral 6, having a larger diameter than the passage 4, is provided adjacent the inner end of the passage 4 and communicates therewith so as to form an annular shoulder 7. A second bore 8, having a diameter larger than the bore 6, is then provided adjacent the bore 6 in communication therewith, thereby to provide an annular shoulder 9. A third bore 10, having a diameter larger than the bore 8, is then provided and communicates therewith, thereby to provide another annular shoulder 11.

The end of the tubular member 5 which is inserted into the body member 1 abuts against the annular shoulder 7 therein, and communicates with the passage 4 so that any fluid under pressure flowing through the tube 5 will pass through the passageway 4 and to the mechanical device to be operated thereby.

A sealing ring, or 0-ring 12 is inserted in the bore 8 and against the annular shoulder 9, thereby to prevent the leakage of any fluid passing through the tube 5 when the tube is assembled therewith. The inner and outer diameters of this sealing ring 12 are such that, when the tube 5 is inserted therethrough, the ring will be deformed and will have a tight fit against the wall of the bore 8 and against the outer surface of the tube 5.

A retaining ring 13, the details of which will be described in greater detail hereinafter, is then placed in the bore 10 and against the annular shoulder 11. The inner diameter of the retaining ring 13 is smaller than the outer diameter of the tube 5, and the material of the ring is bent adjacent the inner diameter thereof in such fashion that when the tube 5 is inserted therein, the edge of the inner diameter will grip the tubular member and prevent inadvertent removal thereof.

A retainer member 14 is positioned in the third bore 10 and bears against the retaining ring 11, thereupon holding the sealing ring and retaining ring in place. This retainer member 14 may be secured within the bore by any suitable means but preferably, it is press fitted into the bore to lock the other elements of the assembly in place.

The fitting is assembled with the sealing ring 12, retaining ring 13, and retainer member 14, all in place, and the assembly may then be connected to the mechanical device to be actuated by the fluid pressure. At that time the tubular member 5 is inserted through the hole 15 in the retainer member 14, and through the retaining ring and sealing ring until the inner end thereof abuts against the shoulder 7, thereby communicating with the passage 4.

Figure 4:
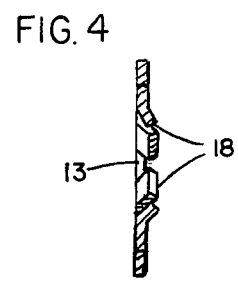
FIG. 4 is a vertical sectional view of the retaining ring taken along the plane of line 4—4 of FIG. 3.
Figure 5:
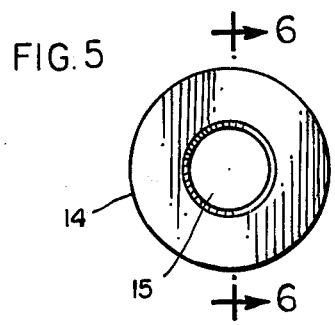
FIG. 5 is an elevational view of the retainer member.
Figure 6:
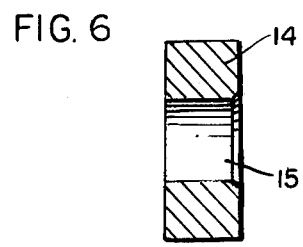
FIG. 6 is a vertical sectional view of the retainer member taken along the plane of line 6—6 of FIG. 5.

The retaining ring 11 is preferably formed as a flat ring with the major portion of the material extending inwardly from the circumference thereof relatively flat, so that, when it is assembled this portion will lie flat against the annular shoulder 11 in a plane perpendicular to the tubular member 5. The portion of the retaining ring adjacent the inner diameter thereof is bent forwardly, in the direction in which the tubular member moves as it is inserted into the fitting, as shown clearly in FIGS. 1 and 4, so that the inner edge will bite into the surface of the tubular member and grip it to hold it in place.

Although the function of the retaining ring could be performed equally as well if the inner diameter thereof was uninterrupted, it is nevertheless preferable that the inner edge 16 have a plurality of radially extending slots 17, thereby to provide a plurality of gripping fingers or teeth 18.

In operation, the fitting is installed in its appropriate location as described hereinabove, at which time the tubing 5 is then inserted in the opening 15 through the retainer member and pushed or forced past the retaining ring 13 and the sealing ring 12 against the shoulder 7. The interference fit between the fingers or teeth 18 of the retaining ring will bite into the tubing thereby locking it in place. The sealing ring 12 seals the tubing against leakage through the bores of the fitting and the hole in the retainer insert, which also supports the tube under bending stress.

The interference fit of the retaining ring is so designed so that it will grip the tubing with a force many times greater than the applied force to the projected area of the end of the tubing under normal operating pressure. The tube, however, may be easily withdrawn from the fitting by pulling it free of the retaining ring, thereby making it unnecessary to disassemble the fitting in order to remove the tube. The force required to pull the tube free is greater than the force necessary to slip it through the sealing and retaining rings, and greater than the applied force during usage. For example, it has been found that typical values for a plastic tubing having an outer diameter of ¼, might be 2 pounds force to insert the tube, 4 pounds force applied to the tube at 150 p.s.i., and 6 pounds pull to release the tube or pull it free of the fitting. The tube may be reused as many times as desired as long as the sealing ring continues to function satisfactorily for the sealing operation. In the event the tubing may be scored by the retaining fingers, it is a simple procedure merely to cut a small piece of tubing off the end thereof and to insert it into the fitting.

I claim:

1. A fitting assembly adapted to receive and retain therein a tubular member comprising,
    a. a main body member having a passageway therein adapted to communicate with a tubular member inserted in said body member,
    b. a first bore in said body to receive the tubular member therein and having a diameter larger than the diameter of said passageway and communicating therewith, thereby forming an annular shoulder to provide a stop against which the tubular member abuts when inserted in said body, the surface of said first bore acting as a support for the tubular member,
    c. a second bore in said body having a diameter larger than the diameter of said first bore and communicating therewith, thereby forming a second annular shoulder in said body and providing a first annular recess between the wall of said second bore and the outer surface of the tubular member when inserted therein,
    d. an annular sealing ring located in said annular recess adapted to be in sealing engagement with said wall of said second bore, said second annular shoulder and said tubular member when said member is inserted therein,
    e. a third bore in said body having a diameter larger than the diameter of said second bore and communicating therewith, thereby forming a third annular shoulder in said body and providing a second annular recess between the wall of said third bore and the outer surface of the tubular member when inserted therein,
    f. a retaining ring in said second annular recess abutting against said third annular shoulder and having an inner diameter smaller than the outer diameter of the tubular member inserted therein, a portion of said retaining ring adjacent the inner diameter thereof extending toward said annular sealing ring and bearing thereagainst, whereby the inner annular edge of said ring will bite into the surface of the tubular member and prevent inadvertent removal thereof, the circumference of said inner annular edge of said ring being in substantially the same radial plane, thereby to enable rotation of said tube without causing axial displacement thereof relative to the fitting assembly and,
    g. a retainer member secured within said third bore against said retaining ring, thereby locking said retaining ring and said sealing ring in place.

2. A fitting assembly as defined in claim 1, wherein said portion of said retaining ring adjacent the inner diameter thereof is radially slotted, thereby providing a plurality of gripper fingers for biting into the surface of the tubular member.

3. A fitting assembly as defined in claim 1, wherein said retainer member is secured within said third bore by means of a press fit therein.

4. A fitting assembly as defined in claim 1, wherein the outer portion of said retaining ring is flat in a plane substantially perpendicular to the axis of said third bore for a distance radially inwardly at least equal to the width of said third annular shoulder before merging with that portion adjacent the inner diameter thereof which extends toward said annular sealing ring.

* * * * *